(12) United States Patent
Cordonnier et al.

(10) Patent No.: US 6,748,989 B2
(45) Date of Patent: Jun. 15, 2004

(54) MULTI-LAYER STEEL CABLE FOR TIRE CARCASS (76) Inventors: Francois-Jacques Cordonnier, 33 rue Beausoleil, FR-63100 Clermont-Ferrand (FR); Alain Domingo, 6, Rt de la Croix Mozat, FR-63190 Orleat (FR)

( * ) Notice: Subject to any disclaimer, the term of this patent is extended or adjusted under 35 U.S.C. 154(b) by 348 days.

(21) Appl. No.: 10/024,061

(22) Filed: Dec. 18, 2001

(65) Prior Publication Data

US 2002/0153078 A1 Oct. 24, 2002

Related U.S. Application Data (63) Continuation of application No. PCT/EP00/05882, filed on Jun. 26, 2000.

(30) Foreign Application Priority Data

Jun. 29, 1999 (FR) .............................. 99/08466

(51) Int. Cl.⁷ .............................. B60C 9/00; B60C 9/04; D07B 1/08
(52) U.S. Cl. .......................... 152/556; 57/213; 57/902; 152/451; 428/295.4
(58) Field of Search ................... 57/213, 902; 152/451, 152/556; 428/295.4

(56) References Cited

FOREIGN PATENT DOCUMENTS

| EP | 0719889 A1 | 7/1996 |
|---|---|---|
| WO | WO 98/41682 A1 | 9/1998 |

OTHER PUBLICATIONS

U.S. patent application Ser. No. 10/178,148, Cordonnier et al.
Rsch Discl 3343 343, Nov. 1992.

Primary Examiner—Adrienne C. Johnstone
(74) Attorney, Agent, or Firm—Felipe J. Farley; Christopher P. Crecarke; Alan A. Csantos

(57) ABSTRACT

A multi-layer cable having an unsaturated outer layer, comprising a core (C0) of diameter $d_0$ surrounded by an intermediate layer (C1) of six or seven wires (M=6 or 7) of diameter $d_1$ wound together in a helix at a pitch $p_1$, surrounded by an outer layer (C2) of N wires of diameter $d_2$ wound together in a helix at a pitch $p_2$, N being less by 1 to 3 than the maximum number $N_{max}$ of wires which can be wound in one layer about the layer C1, this cable has the following characteristics ($d_0$, $d_1$, $d_2$, $p_1$ and $p_2$ in mm):

(i) $0.14 < d_0 < 0.28$;
(ii) $0.12 < d_1 < 0.25$;
(iii) $0.12 < d_2 < 0.25$;
(iv) for M=6: $1.10 < (d_0/d_1) < 1.40$; for M=7: $1.40 < (d_0/d_1) < 1.70$;
(v) $5\pi(d_0+d_1) < p_1 < p_2 < 5\pi(d_0+2d_1+d_2)$;
(vi) the wires of layers C1 and C2 are wound in the same twist direction.

The invention furthermore relates to the articles or semi-finished products made of plastics material and/or rubber which are reinforced by such a multi-layer cable, in particular to tires intended for industrial vehicles, more particularly truck tires and their carcass reinforcement plies.

37 Claims, 2 Drawing Sheets

MULTI-LAYER STEEL CABLE FOR TIRE CARCASS

The present application is a continuation of International Application No. PCT/EP 00/05882, filed 26, Jun. 2000, published in French with an English Abstract on 4, Jan. 2001 under PCT Article 21(2).

BACKGROUND OF THE INVENTION

The present invention relates to steel cables ("steel cords") which can be used for reinforcing rubber articles such as tires. It relates more particularly to the cables referred to as "layered" cables which can be used for reinforcing the carcass reinforcements of tires for industrial vehicles such as "truck" tires.

Steel cables for tires, as a general rule, are formed of wires of perlitic (or ferro-perlitic) carbon steel, hereinafter referred to as "carbon steel", the carbon content of which is generally between 0.2% and 1.2%, the diameter of these wires most frequently being between 0.10 and 0.40 mm (millimeters). A very high tensile strength is required of these wires, generally greater than 2000 MPa, preferably greater than 2500 MPa, which is obtained owing to the structural hardening which occurs during the phase of work-hardening of the wires. These wires are then assembled in the form of cables or strands, which requires the steels used also to have sufficient ductility in torsion to withstand the various cabling operations.

For reinforcing carcass reinforcements of truck tires, nowadays most frequently so-called "layered" steel cables ("layered cords") or "multi-layer" steel cables formed of a central core and one or more concentric layers of wires arranged around this core. These layered cables, which favor greater contact lengths between the wires, are preferred to the older "stranded" cables ("strand cords") owing firstly to greater compactness, and secondly to lesser sensitivity to wear by fretting. Among layered cables, a distinction is made in particular, in known manner, between compact-structured cables and cables having tubular or cylindrical layers.

The layered cables most widely found in the carcasses of truck tires are cables of the formula (L+M) or (L+M+N), the latter generally being intended for the largest tires. These cables are formed, in known manner, of a core of L wire(s) surrounded by at least one layer of M wires which may itself be surrounded by an outer layer of N wires, with generally L varying from 1 to 4, M varying from 3 to 12, N varying form 8 to 20; if applicable, the assembly may possibly be wrapped by an external wrapping wire wound in a helix around the last layer.

Such layered cables which can be used for reinforcing tire carcasses, in particular carcasses of truck tires, have been described in a very large number of publications. Reference will be made in particular to the documents U.S. Pat. Nos. 3,922,841; 4,158,946; 4,488,587; EP-A-0 168 858; EP-A-0 176 139 or U.S. Pat. No. 4,651,513; EP-A-0 194 011; EP-A-0 260 556 or U.S. Pat. No. 4,756,151; EP-A-0 362 570; EP-A-0 497 612 or U.S. Pat. No. 5,285,836; EP-A-0 568 271; EP-A-0 648 891; EP-A-0 669 421 or U.S. Pat. No. 5,595,057; EP-A-0 709 236 or U.S. Pat. No. 5,836,145; EP-A-0 719 889 or U.S. Pat. No. 5,697,204; EP-A-0 744 490 or U.S. Pat. No. 5,806,296; EP-A-0 779 390 or U.S. Pat. No. 5,802,829; EP-A-0 834 613; WO98/41682; RD (Research Disclosure) No. 34054, August 1992, pp. 624–33; RD No. 34370, November 1992, pp. 857–59.

In order to fulfil their function as reinforcement for tire carcasses, the layered cables must first of all have good flexibility and high endurance under flexion, which implies in particular that their wires are of relatively low diameter, normally less than 0.28 mm, preferably less than 0.25 mm, in particular less than that of the wires used in conventional cables for crown reinforcements of tires.

These layered cables are furthermore subjected to major stresses during running of the tires, in particular to repeated flexure or variations in curvature, which cause friction at the level of the wires, in particular as a result of the contact between adjacent layers, and therefore of wear, and also of fatigue; they must therefore have high resistance to so-called "fatigue-fretting" phenomena.

Finally, it is important for them to be impregnated as much as possible with rubber, and for this material to penetrate into all the spaces between the wires forming the cables, because if this penetration is insufficient, there then form empty channels along the cables, and the corrosive agents, for example water, which are likely to penetrate as far as into the tires for example as a result of cuts, move along these channels and into the carcass of the tire. The presence of this moisture plays an important part in causing corrosion and in accelerating the above degradation processes (so-called "fatigue-corrosion" phenomena), compared with use in a dry atmosphere.

All these fatigue phenomena which are generally grouped together under the generic term "fatigue-fretting-corrosion" are at the origin of gradual degeneration of the mechanical properties of the cables, and may adversely affect the life thereof under very severe running conditions.

In order to improve the endurance of layered cables in truck tire carcasses, in which in known manner the repeated flexural stresses may be particularly severe, it has for a long time been proposed to modify the design thereof in order to increase, in particular, their ability to be penetrated by rubber, and thus to limit the risks due to corrosion and to fatigue-corrosion.

There have for example been proposed or described layered cables of the construction (3+9) or (3+9+15) which are formed of a core of 3 wires surrounded by a first layer of 9 wires and if applicable a second layer of 15 wires, as described, for example, in EP-A-0 168 858, EP-A-0 176 139, EP-A-0 497 612, EP-A-0 669 421, EP-A-0 709 236, EP-A-0 744 490 and EP-A-0 779 390, the diameter of the wires of the core being or not being greater than that of the wires of the other layers. These cables cannot be penetrated as far as the core owing to the presence of a channel or capillary at the centre of the three core wires, which remains empty after impregnation by the rubber, and therefore favorable to the propagation of corrosive media such as water.

The publication RD No. 34370 describes cables of the structure [1+6+12], of the compact type or of the type having concentric tubular layers, formed of a core formed of a single wire, surrounded by an intermediate layer of 6 wires which itself is surrounded by an outer layer of 12 wires. The ability of rubber to penetrate it can be improved by using diameters of wires which differ from one layer to the other, or even within one and the same layer. Cables of construction [1+6+12], the penetration ability of which is improved owing to appropriate selection of the diameters of the wires, in particular to the use of a core wire of larger diameter, have also been described, for example in EP-A-0 648 891 or WO98/41682.

In order to improve further, relative to these conventional cables, the penetration of the rubber into the cable, there have been proposed multi-layer cables having a central core surrounded by at least two concentric layers, for example cables of the formula [1+6+N], in particular [1+6+11], the outer layer of which is unsaturated (incomplete), thus ensuring better penetration ability by the rubber (see, for example, EP-A-0 719 889, WO98/41682). The proposed constructions make it possible to dispense with the wrapping wire, owing to better penetration of the rubber through the outer layer and the self-wrapping which results; however, experience shows that these cables are not penetrated right to the centre by the rubber, and in any case not yet optimally.

Furthermore, it should be noted that an improvement in the ability of the rubber to penetrate is not sufficient to ensure a sufficient level of performance. When they are used for reinforcing tire carcasses, the cables must not only resist corrosion, but also must fulfil a large number of sometimes contradictory criteria, in particular of tenacity, resistance to fretting, high degree of adhesion to rubber, uniformity, flexibility, endurance under repeated flexing or traction, stability under severe flexing, etc.

Thus, for all the reasons set forth previously, and despite the various recent improvements which have been made here or there on such and such a given criterion, the best cables used today in carcass reinforcements for truck tires remain limited to a small number of layered cables of highly conventional structure, of the compact type or the type having cylindrical layers, with a saturated (complete) outer layer; these are essentially cables of constructions [3+9], [3+9+15] or [1+6+12] as described previously.

Now, the Applicant during its research discovered a novel layered cable of the type having an unsaturated outer layer, which unexpectedly improves further the overall performance of the best layered cables known for reinforcing truck tire carcasses. This cable of the invention, owing to a specific structure, not only has excellent ability to be penetrated by the rubber, limiting the problems of corrosion, but also has fatigue-fretting endurance properties which are significantly improved compared with the cables of the prior art. The longevity of truck tires and that of their carcass reinforcements is thus very substantially improved thereby.

BRIEF SUMMARY OF THE INVENTION

Consequently, a first subject of the invention is a multi-layer cable having a unsaturated outer layer, usable as a reinforcing element for a tire carcass reinforcement, comprising a core (C0) of diameter $d_0$ surrounded by an intermediate layer (C1) of six or seven wires (M=6 or 7) of diameter $d_1$ wound together in a helix at a pitch $p_1$, this layer C1 itself being surrounded by an outer layer (C2) of N wires of diameter $d_2$ wound together in a helix at a pitch $p_2$, N being less by 1 to 3 than the maximum number $N_{max}$ of wires which can be wound in one layer about the layer C1, this cable being characterised in that it has the following characteristics ($d_0$, $d_1$, $d_2$, $p_1$ and $p_2$ in mm):

(i) $0.14 < d_0 < 0.28$;
(ii) $0.12 < d_1 < 0.25$;
(iii) $0.12 < d_2 < 0.25$;
(iv) for M=6: $1.10 < (d_0/d_1) < 1.40$; for M=7: $1.40 < (d_0/d_1) < 1.70$;
(v) $5\pi(d_0+d_1) < p_1 < p_2 < 5\pi(d_0+2d_1+d_2)$;
(vi) the wires of layers C1 and C2 are wound in the same direction of twist.

The invention also relates to the use of a cable according to the invention for reinforcing articles or semi-finished products made of plastics material and/or of rubber, for example plies, tubes, belts, conveyor belts and tires, more particularly tires intended for industrial vehicles which usually use a metal carcass reinforcement.

The cable of the invention is very particularly intended to be used as a reinforcing element of a carcass reinforcement for a tire intended for industrial vehicles selected from among vans, "heavy vehicles"—i.e. subway trains, buses, road transport machinery (lorries, tractors, trailers), off-road vehicles—agricultural machinery or construction machinery, aircraft, and other transport or handling vehicles.

The invention furthermore relates to these articles or semi-finished products made of plastics material and/or rubber themselves when they are reinforced by a cable according to the invention, in particular tires intended for the industrial vehicles mentioned above, more particularly truck tires, and also to composite fabrics comprising a matrix having a composition of rubber composition reinforced with a cable according to the invention, usable as a carcass reinforcement ply for such truck tires.

BRIEF DESCRIPTION OF THE DRAWINGS

The invention and its advantages will be readily understood in the light of the description and examples of embodiment which follow, and FIGS. 1 to 3 relating to these examples, which show, respectively:

a cross-section through a cable of structure [1+6+11] according to the invention (FIG. 1);

a cross-section through a cable of structure [1+6+12] of the prior art (FIG. 2);

a radial section through a truck tire having a radial carcass reinforcement (FIG. 3).

I. MEASUREMENTS AND TESTS

I-1. Dynamometric Measurements

As far as the metal wires or cables are concerned, the measurements of breaking load Fm (maximum load in N), of tensile strength Rm (in MPa) and of elongation at break At (total elongation in %) are carried out under tension in accordance with ISO Standard 6892 of 1984. As far as the rubber compositions are concerned, the measurements of modulus are carried out under tension in accordance with Standard AFNOR-NFT-46002 of September 1988: the nominal secant modulus (or apparent stress, in MPa) is measured in a second elongation (i.e. after an accommodation cycle) at 10% elongation, referred to as M10 (normal conditions of temperature and humidity in accordance with Standard AFNOR-NFT-40101 of December 1979).

I-2. Air Permeability Test

The air permeability test makes it possible to measure a relative index of air permeability, "Pa". It is a simple way of indirectly measuring the degree of penetration of the cable by a rubber composition. It is performed on cables extracted directly, by decortication, from the vulcanized rubber plies which they reinforce, and which therefore have been penetrated by the cured rubber.

The test is carried out on a given length of cable (for example 2 cm) as follows: air is sent to the entry of the cable, at a given pressure (for example 1 bar), and the quantity of air is measured at the exit, using a flow meter; during the measurement, the sample of cable is locked in a seal such that only the quantity of air passing through the cable from one end to the other, along its longitudinal axis, is taken into account for the measurement. The flow measured is lower, the higher the amount of penetration of the cable by the rubber.

I-3. Test of Endurance in the Tire

The endurance of the cables under fatigue-fretting corrosion is evaluated in carcass plies of truck tires for a very long-duration running test.

For this, truck tires are manufactured, the carcass reinforcement of which is formed of a single rubberised ply reinforced by the cables to be tested. These tires are mounted on suitable known rims and are inflated to the same pressure (with an excess pressure relative to nominal pressure) with air saturated with moisture. Then these tires are run on an automatic running machine under a very high load (overload relative to the nominal load) and at the same speed, for a given number of kilometers. At the end of the running, the cables are extracted from the tire carcass by decortication, and the residual breaking load is measured both on the wires and on the cables thus fatigued.

Furthermore, tires identical to the previous ones are manufactured and they are decorticated in the same manner as previously, but this time without subjecting them to running. Thus the initial breaking load of the non-fatigued wires and cables is measured after decortication.

Finally the breaking-load degeneration after fatigue is calculated (referred to as ΔFm and expressed in %), by comparing the residual breaking load with the initial breaking load. This degeneration ΔFm is due to the fatigue and wear (reduction in section) of the wires which are caused by the joint action of the various mechanical stresses, in particular the intense working of the contact forces between the wires, and the water coming from the ambient air, in other words to the fatigue-fretting corrosion to which the cable is subjected within the tire during running.

It may also be decided to perform the running test until forced destruction of the tire occurs, owing to a break in the carcass ply or another type of damage occurring earlier (for example detreading).

I-4. Belt Test

The "belt" test is a known fatigue test which was described, for example, in applications EP-A-0 648 891 or WO98/41682 mentioned above, the steel cables to be tested being incorporated in a rubber article which is vulcanized.

The principle thereof is as follows: the rubber article is an endless belt produced with a known rubber-based mixture, similar to those which are currently used for radial tire carcasses. The axis of each cable is oriented in the longitudinal direction of the belt and the cables are separated from the faces of the latter by a thickness of rubber of about 1 mm. When the belt is arranged so as to form a cylinder of revolution, the cable forms a helical winding of the same axis as this cylinder (for example, helix pitch equal to about 2.5 mm).

This belt is then subjected to the following stresses: the belt is rotated around two rollers, such that each elementary portion of each cable is subjected to a tension of 12% of the initial breaking load and is subjected to cycles of variation of curvature which make it pass from an infinite radius of curvature to a radius of curvature of 40 mm, and this over 50 million cycles. The test is carried out under a controlled atmosphere, the temperature and the humidity of the air in contact with the belt being kept at about 20° C. and 60% relative humidity. The duration of the stresses for each belt is of the order of 3 weeks. At the end of these stresses, the cables are extracted from the belts by decortication, and the residual breaking load of the wires of the fatigued cables is measured.

Secondly, a belt is manufactured which is identical to the previous one, and it is decorticated in the same manner as previously, but this time without subjecting the cables to the fatigue test. Thus the initial breaking load of the wires of the non-fatigued cables is measured.

Finally, the degeneration of breaking load after fatigue is calculated (referred to as ΔFm and expressed in %), by comparing the residual breaking load with the initial breaking load.

This degeneration ΔFm is due in known manner to the fatigue and wear of the wires which are caused by the joint action of the stresses and the water coming from the ambient air, these conditions being comparable to those to which the reinforcement cables are subjected in the tire carcasses.

I-5. Undulating Traction Test

The "undulating traction" test is a fatigue test well-known to the person skilled in the art, in which the material tested is fatigued in a pure uni-axial extension (extension-extension), that is to say without compressive stress.

The principle is as follows: A sample of the cable to be tested, which is held at each of its two ends by the two jaws of a traction machine, is subjected to a tensile or extensional stress, the intensity σ of which varies cyclically and symmetrically ($\sigma_{avg} \pm \sigma_a$) about an average value ($\sigma_{avg}$), between two extreme values $\sigma_{min}$ ($\sigma_{avg}-\sigma_a$) and $\sigma_{max}$ ($\sigma_{avg}+\sigma_a$) surrounding this average value, at a given ratio of load "R"=($\sigma_{min}/\sigma_{max}$). The average stress $\sigma_{avg}$ is therefore linked to the ratio of load R and to the amplitude $\sigma_a$ by the relationship $\sigma_{avg}=\sigma_a(1+R)/(1-R)$.

In practice, the test is performed as follows: a first amplitude of stress $\sigma_a$ is selected (generally within a range of the order of ¼ to ⅓ of the resistance Rm of the cable) and the fatigue test is started for a maximum number of $10^5$ cycles (frequency 30 Hz), the load ratio R being set to 0.1. Depending on the result obtained—i.e. breaking or non-breaking of the cable after this maximum of $10^5$ cycles—a new amplitude $\sigma_a$ is applied (less or greater than the previous one, respectively) to a new test piece, by varying this value $\sigma_a$ in accordance with the so-called steps method (Dixon & Mood; Journal of the American Statistical Association, 43, 1948, 109–126). Thus a total of 17 iterations are effected, the statistical treatment of the tests which is defined by this steps method resulting in the determination of an endurance limit—$\sigma_d$—which corresponds to a 50% probability of breaking of the cable at the end of the $10^5$ fatigue cycles.

For this test, a tensile fatigue machine manufactured by Schenck (Model PSA) is used; the useful length between the two jaws is 10 cm; the measurement is effected in a controlled dry atmosphere (amount of relative humidity less than or equal to 5%; temperature 20° C.).

II. DETAILED DESCRIPTION OF THE INVENTION

II-1. Cable of the Invention

The terms "formula" or "structure", when used in the present description to describe the cables, refer simply to the construction of these cables.

The cable of the invention is a multi-layer cable comprising a core (C0) of diameter $d_0$, an intermediate layer (C1) of 6 or 7 wires (M=6 or 7) of diameter $d_1$ and an unsaturated outer layer (C2) of N wires of diameter $d_2$, N being less by 1 to 3 than the maximum number $N_{max}$ of wires which can be wound in a single layer around the layer C1.

In this layered cable of the invention, the diameter of the core and that of the wires of the layers C1 and C2, the helix pitches (and hence the angles) and the directions of winding of the different layers are defined by all the characteristics cited hereafter ($d_0$, $d_1$, $d_2$, $p_1$ and $p_2$ expressed in mm):

(i) $0.14 < d_0 < 0.28$;

(ii) $0.12 < d_1 < 0.25$;

(iii) $0.12 < d_2 < 0.25$;

(iv) for M=6: $1.10 < (d_0/d_1) < 1.40$; for M=7: $1.40 < (d_0/d_1) < 1.70$;

(v) $5\pi(d_0+d_1) < p_1 < p_2 < 5\pi(d_0+2d_1+d_2)$;

(vi) the wires of layers C1 and C2 are wound in the same direction of twist.

Characteristics (i) to (vi) above, in combination, make it possible to obtain, all at once:

- contact forces which are sufficient but limited between C0 and C1, which are beneficial for reduced wear and less fatigue of the wires of layer C1;
- due in particular to optimisation of the ratio of the diameters ($d_0/d_1$) and the helix angles formed by the wires of layers C1 and C2, optimum penetration of the rubber through layers C1 and C2 and as far as the centre C0 of the latter, which firstly ensures very high protection against corrosion or the possible propagation thereof, and secondly minimal disorganisation of the cable under high flexural stress, not requiring in particular the presence of a wrapping wire around the final layer;
- reduced wear by fretting between the wires of layers C1 and C2, despite the presence of different pitches ($p_1 \neq p_2$) between the two layers C1 and C2.

Characteristics (v) and (vi)—different pitches $p_1$ and $p_2$, and layers C1 and C2 wound in the same direction of twist—mean that, in known manner, the wires of layers C1 and C2 are essentially arranged in two adjacent, concentric cylindrical (i.e. tubular) layers. So-called "tubular" or "cylindrical" layered cables are thus understood to be cables formed of a core (i.e. core part or central part) and one or more concentric layers, each tubular in shape, arranged around this core, such that, at least in the cable at rest, the thickness of each layer is substantially equal to the diameter of the wires which form it; as a result, the cross-section of the cable has a contour or shell (E) which is substantially circular, as illustrated for example in FIG. 1.

Figure 2:
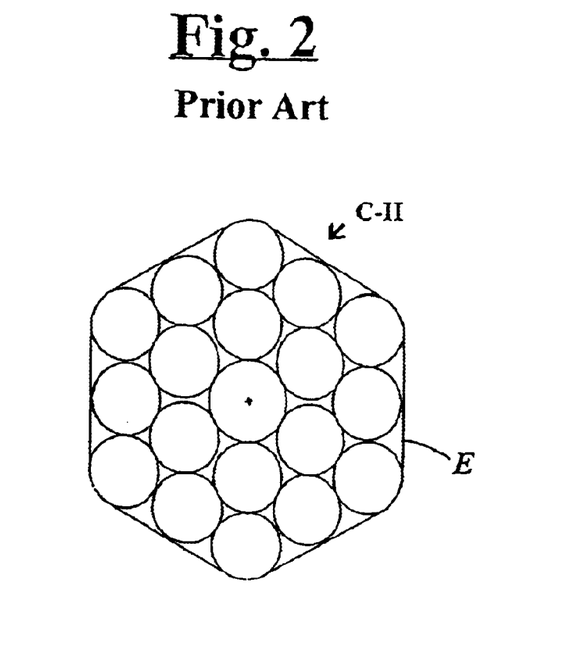

The cables having cylindrical or tubular layers of the invention must in particular not be confused with so-called "compact" layered cables, which are assemblies of wires wound with the same pitch and in the same direction of twist; in such cables, the compactness is such that practically no distinct layer of wires is visible; as a result, the cross-section of such cables has a contour which is no longer circular, but polygonal, as illustrated for example in FIG. 2.

The outer layer C2 is a tubular layer of N wires which is referred to as "unsaturated" or "incomplete", that is to say that, by definition, there is sufficient space in this tubular layer C2 to add at least one (N+1)th wire of diameter $d_2$, several of the N wires possibly being in contact with one another. Reciprocally, this tubular layer C2 would be referred to as "saturated" or "complete" if there was not enough space in this layer to add at least one (N+1)th wire of diameter $d_2$.

Figure 1:
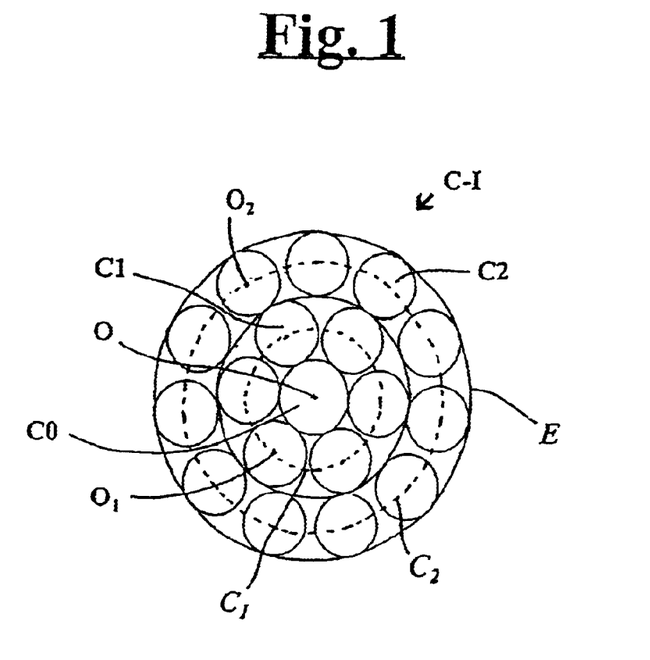

Preferably, the cable of the invention is a layered cable of construction [1+M+N], that is to say that its core is formed of a single wire, as shown, for example, in FIG. 1 (cable referenced C-I).

This FIG. 1 shows a section perpendicular to the axis (O) of the core and of the cable, the cable being assumed to be rectilinear and at rest. It can be seen that the core C0 (diameter $d_0$) is formed of a single wire; it is surrounded by and in contact with an intermediate layer C1 of 6 wires of diameter $d_1$ which are wound together in a helix at a pitch $p_1$; this layer C1, which is of a thickness substantially equal to $d_1$, is itself surrounded by and in contact with an outer layer C2 of 11 wires of diameter $d_2$ which are wound together in a helix at a pitch $p_2$, and therefore of a thickness substantially equal to $d_2$. The wires wound around the core C0 are thus arranged in two adjacent, concentric, tubular layers (layer C1 of thickness substantially equal to $d_1$, then layer C2 of thickness substantially equal to $d_2$). It can be seen that the wires of layer C1 have their axes ($O_1$) arranged practically on a first circle $C_1$ shown by broken lines, whereas the wires of layer C2 have their axes ($O_2$) arranged practically on a second circle $C_2$, also shown by broken lines.

The best compromise of results, with regard in particular to the ability of the cable to be penetrated by the rubber and the contact forces between the different layers, is obtained when the following relationship is satisfied:

$$5.3\pi(d_0+d_1) < p_1 < p_2 < 4.7\pi(d_0+2d_1+d_2). \qquad (vii)$$

By thus offsetting the pitches and therefore the angles of contact between the wires of layer C1 on one hand and those of layer C2 on the other hand, the surface area of the channels for penetrating between these two layers is increased and the ability of the cable to be penetrated is improved further, while optimising its fatigue-fretting performance.

It will be recalled here that, according to a known definition, the pitch represents the length, measured parallel to the axis O of the cable, at the end of which a wire having this pitch makes a complete turn around the axis O of the cable; thus, if the axis O is sectioned by two planes perpendicular to the axis O and separated by a length equal to the pitch of a wire of one of the two layers C1 or C2, the axis of this wire ($O_1$ or $O_2$) has in these two planes the same position on the two circles corresponding to the layer C1 or C2 of the wire in question.

In the cable according to the invention, all the wires of the layers C1 and C2 are wound in the same direction of twist, that is to say in the S direction ("S/S" arrangement) or in the Z direction ("Z/Z" arrangement). Such an arrangement of the layers C1 and C2 is somewhat contrary to the most conventional constructions of layered cables [L+M+N], in particular those of construction [3+9+15], which most frequently require crossing of the two layers C1 and C2 (or an "S/Z" or "Z/S" arrangement) so that the wires of layer C2 themselves wrap the wires of layer C1. Winding the layers C1 and C2 in the same direction advantageously makes it possible, in the cable according to the invention, to minimise the friction between these two layers C1 and C2 and therefore the wear of the wires constituting them.

In the cable of the invention, the ratios ($d_0/d_1$) must be set within given limits, according to the number M (6 or 7) of wires of the layer C1. Too low a value of this ratio is unfavorable to the wear between the core and the wires of layer C1. Too high a value adversely affects the compactness of the cable, for a level of resistance which is finally not greatly modified, and its flexibility; the increased rigidity of the core due to an excessively large diameter $d_0$ would furthermore be unfavorable to the feasibility itself of the cable during the cabling operations.

The wires of layers C1 and C2 may have a diameter which is identical or different from one layer to the other. Preferably wires of the same diameter ($d_1=d_2$) are used, in particular to simplify the cabling process and to reduce the costs, as shown, for example, in FIG. 1.

The maximum number $N_{max}$ of wires which can be wound in a single saturated layer around the layer C1 is of course a function of numerous parameters (diameter $d_0$ of the core, number M and diameter $d_1$ of the wires of layer C1, diameter $d_2$ of the wires of layer C2). By way of example, if $N_{max}$ is equal to 12, N may then vary from 9 to 11 (for example constructions [1+M+9], [1+M+10] or [1+M+11]); if $N_{max}$ is for example equal to 14, N may then vary from 11 to 13 (for example constructions [1+M+11], [1+M+12] or [1+M+13]).

Preferably, the number N of wires in the layer C2 is less by 1 to 2 than the maximum number $N_{max}$. This makes it possible, in the majority of cases, to form sufficient space between the wires for the rubber compositions to be able to infiltrate between the wires of layer C2 and to reach layer C1. The invention is thus preferably implemented with a cable selected from among cables of the structure [1+6+10], [1+6+11], [1+6+12], [1+7+11], [1+7+12] or [1+7+13].

By way of examples of preferred cables according to the invention for which $d_1=d_2$, mention will be made in particular of cables which satisfy the above relationship (vii) and have the following constructions:

[1+6+10] with $d_0=0.15$ mm and $d_1=d_2=0.13$ mm; 4.7 mm$<p_1<p_2<$8 mm;

[1+6+10] with $d_0=0.23$ mm and $d_1=d_2=0.20$ mm; 7.2 mm$<p_1<p_2<$12.3 mm;

[1+6+11] with $d_0=0.20$ mm and $d_1=d_2=0.175$ mm; 6.2 mm$<p_1<p_2<$10.7 mm;

[1+6+11] with $d_0=0.26$ mm and $d_1=d_2=0.225$ mm; 8.1 mm$<p_1<p_2<$13.8 mm;

[1+6+12] with $d_0=0.26$ mm and $d_1=d_2=0.20$ mm; 7.7 mm$<p_1<p_2<$12.7 mm;

[1+6+12] with $d_0=0.225$ mm and $d_1=d_2=0.175$ mm; 6.7 mm$<p_1<p_2<$11.1 mm;

[1+7+11] with $d_0=0.25$ mm and $d_1=d_2=0.175$ mm; 7.1 mm$<p_1<p_2<$11.4 mm;

[1+7+11] with $d_0=0.215$ mm and $d_1=d_2=0.15$ mm; 6.1 mm$<p_1<p_2<$9.8 mm;

[1+7+12] with $d_0=0.23$ mm and $d_1=d_2=0.155$ mm; 6.4 mm$<p_1<p_2<$10.3 mm;

[1+7+12] with $d_0=0.26$ mm and $d_1=d_2=0.175$ mm; 7.2 mm$<p_1<p_2<$11.6 mm;

[1+7+13] with $d_0=0.24$ mm and $d_1=d_2=0.15$ mm; 6.5 mm$<p_1<p_2<$10.2 mm;

[1+7+13] with $d_0=0.275$ mm and $d_1=d_2=0.185$ mm; 7.7 mm$<p_1<p_2<$12.3 mm.

The invention is preferably implemented, in the carcasses of the truck tires, with cables of structure [1+6+N], more preferably of structure [1+6+10], [1+6+11] or [1+6+12]. More preferably still, cables of structure [1+6+11] are used.

For a better compromise between strength, feasibility and flexural strength of the cable on one hand and ability to be penetrated by the rubber compositions on the other hand, it is preferred that the diameters of the wires of layers C1 and C2, whether or not these wires are of identical diameters, be between 0.14 and 0.22 mm.

In such a case, if $d_1=d_2$, more preferably the following relationship is satisfied:

$$5<p_1<p_2<15.$$

For carcass reinforcements for truck tires, the diameters $d_1$ and $d_2$ are even more preferably selected between 0.16 and 0.19 mm: a diameter less than 0.19 mm makes it possible to reduce the level of the stresses to which the wires are subjected upon major variations in curvature of the cables, whereas preferably diameters greater than 0.16 mm will be selected for reasons in particular of strength of the wires and of industrial costs.

When $d_1$ and $d_2$ are thus selected to be between 0.16 and 0.19 mm, the following relationships are more preferably satisfied:

$$0.18<d_0<0.24;$$

$$5<p_1<p_2<12.$$

One advantageous embodiment consists, for example, of selecting $p_1$ to be between 5 and 8 mm and $p_2$ to be between 8 and 12 mm.

The invention may be implemented with any type of steel wires, for example carbon steel wires and/or stainless steel wires as described, for example, in the above applications EP-A-0 648 891 or WO98/41682. Preferably a carbon steel is used, but it is of course possible to use other steels or other alloys.

When a carbon steel is used, its carbon content (% by weight of steel) is preferably between 0.50% and 1.0%, more preferably between 0.68% and 0.95%; these contents represent a good compromise between the mechanical properties required for the tire and the feasibility of the wire. It should be noted that, in applications in which the highest mechanical strengths are not necessary, advantageously carbon steels may be used, the carbon content of which is between 0.50% and 0.68%, and in particular varies from 0.55% to 0.60%, such steels ultimately being less costly because they are easier to draw. Another advantageous embodiment of the invention may also consist, depending on the intended applications, of using steels having a low carbon content of for example between 0.2% and 0.5%, owing in particular to lower costs and greater ease of drawing.

When the cables of the invention are used to reinforced tire carcasses for industrial vehicles, their wires preferably have a tensile strength greater than 2000 MPa, more preferably greater than 3000 MPa. In the case of tires of very large dimensions, in particular wires having a tensile strength of between 3000 MPa and 4000 MPa will be selected. The person skilled in the art will know how to manufacture carbon steel wires having such strength, by adjusting in particular the carbon content of the steel and the final work-hardening ratio ($\epsilon$) of these wires.

The cable of the invention might comprise an external wrap, formed for example of a single wire, whether or not of metal, wound in a helix about the cable in a pitch shorter than that of the outer layer, and a direction of winding opposite or identical to that of this outer layer.

However, owing to its specific structure, the cable of the invention, which is already self-wrapped, does not generally require the use of an external wrapping wire, which advantageously solves the problems of wear between the wrap and the wires of the outermost layer of the cable.

However, if a wrapping wire is used, in the general case in which the wires of layer C2 are made of carbon steel, advantageously a wrapping wire of stainless steel may then be selected in order to reduce the wear by fretting of these carbon steel wires in contact with the stainless steel wrap, as taught by Application WO98/41682 referred to above, the stainless steel wire possibly being replaced in equivalent manner by a composite wire, only the skin of which is of stainless steel and the core of which is of carbon steel, as described for example in Patent Application EP-A-0 976 541.

II-2. Tire of the Invention

The invention also relates to tires intended for industrial vehicles, more particularly truck tires and also to carcass reinforcement plies for these truck tires.

Figure 3:
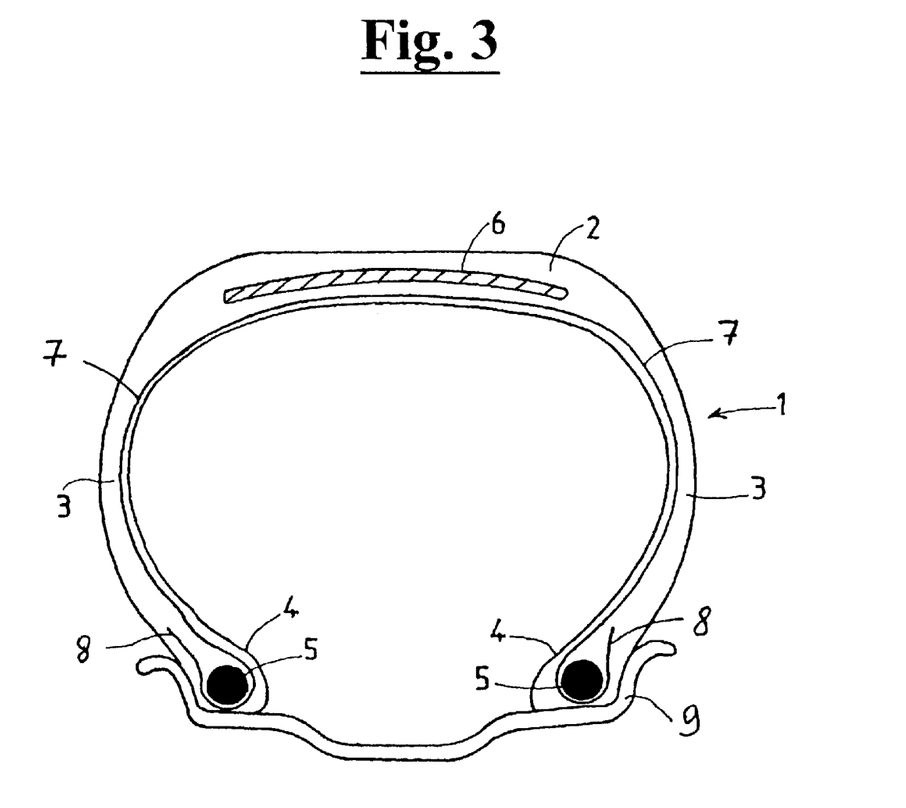

By way of example, FIG. 3 shows diagrammatically a radial section through a truck tire 1 having a radial carcass reinforcement which may or may not be in accordance with the invention, in this general representation. This tire 1 comprises a crown 2, two sidewalls 3 and two beads 4, each of these beads 4 being reinforced with a bead wire 5. The crown 2, in known manner, is reinforced by a crown reinforcement 6 formed for example of at least two superposed crossed plies, reinforced by known metal cables. A carcass reinforcement 7 is wound around the two bead wires 5 within each bead 4, the upturn 8 of this reinforcement 7 being for example arranged towards the outside of the tire 1, which is shown here mounted on its rim 9. The carcass reinforcement 7 is formed of at least one ply reinforced by so-called "radial" cables, that is to say that these cables are arranged practically parallel to each other and extend from one bead to the other so as to form an angle of between 80° and 90° with the median circumferential plane (plane perpendicular to the axis of rotation of the tire which is located halfway between the two beads 4 and passes through the centre of the crown reinforcement 6).

The tire according to the invention is characterised in that its carcass reinforcement 7 comprises at least one carcass ply, the radial cables of which are multi-layer steel cables according to the invention.

In this carcass ply, the density of the cables according to the invention is preferably between 40 and 100 cables per dm (decimeter) of radial ply, more preferably between 50 and 80 cables per dm, the distance between two adjacent radial cables, from axis to axis, thus being preferably between 1.0 and 2.5 mm, more preferably between 1.25 and 2.0 mm. The cables according to the invention are preferably arranged such that the width ("$\ell$") of the rubber bridge, between two adjacent cables, is between 0.35 and 1 mm. This width $\ell$ in known manner represents the difference between the calendering pitch (laying pitch of the cable in the rubber fabric) and the diameter of the cable. Below the minimum value indicated, the rubber bridge, which is too narrow, risks mechanically degrading during working of the ply, in particular during the deformation which it experiences in its own plane by extension of shearing. Beyond the maximum indicated, there are risks of flaws in appearance occurring on the sidewalls of the tires or of penetration of objects, by perforation, between the cables. More preferably, for these same reasons, the width "$\ell$" is selected between 0.5 and 0.8 mm.

Preferably, the rubber composition used for the fabric of the carcass ply has, when vulcanized, (i.e. after curing) a secant tensile modulus M10 which is less than 8 MPa, more preferably between 4 and 8 MPa. It is in such a range of moduli that the best compromise of endurance between the cables of the invention on one hand and the fabrics reinforced by these cables on the other hand has been recorded.

III. EXAMPLES OF EMBODIMENT OF THE INVENTION

III-1. Nature and Properties of the Wires Used

To produce the examples of cables whether or not in accordance with the invention, fine carbon steel wires are used which are prepared in accordance with known methods such as are described, for example, in applications EP-A-0 648 891 or WO98/41682 mentioned above, starting from commercial wires, the initial diameter of which is approximately 1 mm. The steel used is a known carbon steel (USA Standard AISI 1069), the carbon content of which is approx. 0.7%, comprising approximately 0.5% manganese and 0.2% silicon, the remainder being formed of iron and the usual inevitable impurities linked to the manufacturing process for the steel.

The commercial starting wires first undergo known degreasing and/or pickling treatment before their later working. At this stage, their tensile strength is equal to about 1150 MPa, and their elongation at break is approximately 10%. Then copper is deposited on each wire, followed by a deposit of zinc, electrolytically at ambient temperature, and then the wire is heated thermally by Joule effect to 540° C. to obtain brass by diffusion of the copper and zinc, the weight ratio (phase $\alpha$)/(phase $\alpha$+phase $\beta$) being equal to approximately 0.85. No heat treatment is performed on the wire once the brass coating has been obtained.

Then so-called "final" work-hardening is effected on each wire (i.e. after the final heat treatment), by cold-drawing in a wet medium with a drawing lubricant which is in the form of an emulsion in water. This wet drawing is effected in known manner in order to obtain the final work-hardening ratio ($\epsilon$), calculated from the initial diameter indicated above for the commercial starting wires.

By definition, the ratio of a work-hardening operation, $\epsilon$, is given by the formula $\epsilon=\text{Ln}(S_i/S_f)$, in which Ln is the Naperian logarithm, $S_i$ represents the initial section of the wire before this work-hardening and $S_f$ the final section of the wire after this work-hardening.

By adjusting the final work-hardening ratio, thus two groups of wires of different diameters are prepared, a first group of wires of average diameter $\phi$ equal to approximately 0.200 mm ($\epsilon=3.2$) for the wires of index 1 (wires marked $F_1$) and a second group of wires of average diameter $\phi$ equal to approximately 0.175 mm ($\epsilon=3.5$) for the wires of index 2 (wires marked $F_2$).

The steel wires thus drawn have the mechanical properties indicated in Table 1.

The brass coating which surrounds the wires is of very low thickness, significantly less than one micrometer, for example of the order of 0.15 to 0.30 $\mu$m, which is negligible compared with the diameter of the steel wires. Of course, the composition of the steel of the wire in its different elements (for example C, Mn, Si) is the same as that of the steel of the starting wire.

It will be recalled that during the process of manufacturing the wires, the brass coating facilitates the drawing of the wire, as well as the gluing of the wire to the rubber. Of course, the wires could be covered with a fine metal layer other than brass, having for example the function of improving the corrosion resistance of these wires and/or the adhesion thereof to the rubber, for example a fine layer of Co, Ni, Zn, Al, or of an alloy of two or more of the compounds Cu, Zn, Al, Ni, Co, Sn.

III-2. Production of the Cables

The above wires are then assembled in the form of layered cables of structure [1+6+11] for the cables according to the invention (cables C-I), of structure [1+6+12] for the cables of the prior art (cables C-II); the wires $F_1$ are used to form the core C0, and the wires $F_2$ to form the layers C1 and C2 of these various cables.

These cables are manufactured using cabling devices (Barmag cabler) and using processes well-known to the person skilled in the art which are not described here in order to simplify the description. The cable C-II is manufactured in a single cabling operation ($p_1=p_2$), whereas the cable C-I, owing to its different pitches $p_1$ and $p_2$, requires two successive operations (manufacture of a [1+6] cable then cabling of the final layer around this [1+6] cable), these two operations possibly advantageously being effected in-line using two cablers arranged in series.

The cable C-I according to the invention has the following characteristics:

structure [1+6+11]

$d_0=0.200$;

$(d_0/d_1)=1.14$;

$d_1=d_2=0.175$;

$p_1=7$; $p_2=10$.

The control cable C-II has the following characteristics:

structure [1+6+12]

$d_0$=0.200;

$(d_0/d_1)$=1.14;

$d_1$=$d_2$=0.175;

$p_1$=10; $p_2$=10.

Whatever the cables, the wires $F_2$ of layers C1 and C2 are wound in the same direction of twist (Z direction). The two cables tested are devoid of wrap and have the same diameter of approximately 0.90 mm. The diameter $d_0$ of the core of these cables is the same diameter as that of its single wire $F_1$, which is practically devoid of torsion on itself. It will be noted that these two cables are of very similar construction, the cable of the invention being distinguished solely by the fact that its outer layer C2 comprises one wire less and that its pitches $p_1$ and $p_2$ are different, while furthermore satisfying the above relationship (v). In the cable C-I, N is less by 1 than the maximum number (here $N_{max}$=12) of wires which can be wound in a single saturated layer around the layer C1.

The cable of the invention is a cable having tubular layers as shown in cross-section in FIG. 1, which has already been commented on. The control cable is a compact layered cable as shown in FIG. 2. It can be seen in particular from this cross-section of FIG. 2 that cable C-II, although of very similar construction, owing to its method of cabling (wires wound in the same direction and pitches $p_1$ and $p_2$ being equal) has a far more compact structure than that of cable C-I; as a result, no tubular layer of wires is visible, the cross-section of this cable C-II having a contour E which is no longer circular but hexagonal.

It will be noted that the cable C-I of the invention (M=6) does satisfy the following characteristics:

(i) 0.14<$d_0$<0.28;

(ii) 0.12<$d_1$<0.25;

(iii) 0.12<$d_2$<0.25;

(iv) 1.10<($d_0/d_1$)<1.40;

(v) $5\pi(d_0+d_1)<p_1<p_2<5\pi(d_0+2d_1+d_2)$;

(vi) the wires of layers C1 and C2 are wound in the same direction of twist.

This cable C-I furthermore satisfies each of the following preferred relationships:

$5.3\pi(d_0+d_1)<p_1<p_2<4.7\pi(d_0+2d_1+d_2)$;

0.18<$d_0$<0.24;

0.16<$d_1$=$d_2$<0.19;

5<$p_1$<$p_2$<12.

The mechanical properties of these various cables are shown in Table 2. The elongation At shown for the wires is the total elongation recorded upon breaking of the wire, that is to say both the elastic portion of the elongation (Hooke's Law) and the plastic portion of the elongation. As for the elongation of the cables, there is added in known manner to these two portions the so-called structural portion of the elongation, which is inherent to the specific geometry of the cable tested.

III-3. Endurance in the Tire

A) Test 1

The above layered cables are incorporated by calendering on a rubberised fabric formed of a known composition based on natural rubber and carbon black as reinforcing filler, which is conventionally used for manufacturing carcass plies for radial truck tires (M10 equal to approximately 6 MPa, after curing). This composition essentially comprises, in addition to the elastomer and the reinforcing filler, an antioxidant, stearic acid, an extending oil, cobalt naphthenate as adhesion promoter, and finally a vulcanization system (sulphur, accelerator, ZnO).

These cables are arranged parallel in known manner at a density of 63 cables per dm of ply, which, taking into account the diameter of the cables, is equivalent to a width "$\ell$" of the rubber bridges, between two adjacent cables, of approximately 0.70 mm.

Then two series (referenced P-1 and P-2) of truck tires, of dimension 315/80 R 22.5 XZA, are manufactured which are intended to be mounted on a rim having conical seats (inclination of 15 degrees) with two tires in each series, one intended for running, and the other for decortication on a new tire. The carcass reinforcement of these tires is formed of a single radial ply formed of the rubberised fabric above, reinforced by cables C-I and C-II respectively.

The tires P-1 constitute the series in accordance with the invention, and tires P-2 the control series of the prior art. These tires are therefore identical with the exception of the layered cables which reinforce their carcass reinforcement 7.

Their crown reinforcement 6, in particular, is in known manner formed of (i) two triangulation half-plies reinforced with metal cables inclined at 65 degrees, surmounted by (ii) two crossed superposed working plies, reinforced with inextensible metal cables which are inclined at 26 degrees (radially inner ply) and 18 degrees (radially outer ply), these two working plies being covered by (iii) a protective crown ply reinforced with elastic metal cables (high elongation) inclined at 18 degrees. In each of these crown reinforcement plies, the metal cables used are known conventional cables, which are arranged substantially parallel to each other, and all the angles of inclination indicated are measured relative to the median circumferential plane.

The tires P-2 are tires sold by the Applicant for heavy vehicles and, owing to their recognised performance, constitute a control of choice for this test.

These tires are subjected to a running test as described in §I -3, with a total of 250,000 km covered. The distance imposed on each type of tire is very great; it is equivalent to continuous running of a duration of approximately five months and to 80 million fatigue cycles.

Despite these very severe running conditions, the two tires tested run without damage until the end of the test, in particular without breaking of the cables of the carcass ply; this illustrates in particular for the person skilled in the art the high performance of the two types of tires, including the control tires.

After running, decortication is effected, that is to say extraction of the cables from the tires. The cables are then subjected to tensile tests, by measuring each time the initial breaking load (cable extracted from the new tire) and the residual breaking load (cable extracted from the tire after running) of each type of wire, according to the position of the wire in the cable, and for each of the cables tested. The average degeneration $\Delta Fm$ given in % in Table 3 is calculated both for the core wires (C0) and for the wires of layers C1 and C2. The overall degenerations $\Delta Fm$ are also measured on the cables themselves.

On reading Table 3, it will be noted that, whatever the zone of the cable which is analysed (core C0, layers C1 or C2), the best results are recorded on the cable C-I according to the invention. Although the degenerations $\Delta Fm$ remain fairly similar as far as the outer layer C2 is concerned (although less in the cable according to the invention), it will be noted that the further one penetrates into the cable (layer C1 then core C0), the more the gaps become in favor of the cable according to the invention; the degeneration of the core, in particular, is four times less in the cable of the invention (2% instead of 8%). The overall degeneration ΔFm of the cable of the invention is substantially less than that of the control cable (2% instead of 5%).

Correlatively to the above results, visual examination of the various wires shows that the phenomena of wear or fretting (erosion of material at the points of contact), which result from repeated friction of the wires on each other, are substantially reduced in the cables C-1 compared with the cables C-2.

These results are unexpected given that the person skilled in the art might expect, on the contrary, that the selection of different helix pitches $p_1$ and $p_2$ in the cable according to the invention, and hence the presence of different angles of contact between the layers C1 and C2—the effect of which is to reduce the contact surfaces and hence to increase the contact pressures between the wires of layers C1 and C2—would on the contrary result in an increase in the friction and hence the wear between the wires, and finally, ultimately will adversely affect the cable. Such is not the case.

B) Test 2

A new running test is performed with the same fabrics as previously, reinforced with the cables C-I and C-II, by manufacturing two other series of tires (two tires per series), of the same dimensions as in the preceding test. The tires according to the invention are referenced P-3, and the control tires are referenced P-4. The specific conditions of the running test are the same as previously, with the difference that the distance travelled is increased further by 50,000 km, i.e. a total of 300,000 km imposed on the tires.

The results of Table 3 confirm the results of Test 1 above. The lowest degenerations are once again recorded on the cable C-I according to the invention (tire P-3), whatever the layer in question. The further one penetrates into the cable, the more the gaps become to the benefit of the cable of the invention, with in particular a degeneration of the core which is four times less than in the case of the control cable (3% instead of 12%). The result is an overall degeneration of the cable of the invention which is substantially less than that of the control cable (4% instead of 7%).

C) Test 3

A new running test is performed with the same rubberised fabrics as before, but this time in truck tires intended to be mounted on a flat-seat rim, of dimension 10.00 R 20 XZE.

All the tires tested are identical, with the exception of the layered cables which reinforce their carcass reinforcement 7. This carcass reinforcement 7 is formed of a single radial ply formed of the rubberised fabric above, reinforced either by cables C-I or by cables referenced C-III. The crown reinforcement 6 of these tires is in known manner formed of (i) two crossed superposed working plies, reinforced with metal cables inclined by 22 degrees, these two working plies being covered by (ii) a protective crown ply reinforced by elastic metal cables inclined at 22 degrees. In each of these crown reinforcement plies, the metal cables used are known conventional cables, which are arranged substantially parallel to each other, and all the angles of inclination indicated are measured relative to the median circumferential plane.

A series of two tires (referenced P-5) is reinforced by the cables C-I, and another series of two tires (referenced P-6) is reinforced by known cables (referenced C-III) which are described hereafter. In each series, one tire is intended for running, and the other for decortication on a new tire. The tires P-5 therefore constitute the series in accordance with the invention, and tires P-6 the control series.

The cables C-III are known cables of wrapped structure [3+9] (0.23), commonly used for reinforcing truck tires of such dimensions. They are formed of 12 wires (referenced $F_3$ in Table 4) of the same diameter 0.23 mm, with a core of 3 wires wound together in a helix (S direction) in a pitch of 6.5 mm, this core being surrounded by a single layer of 9 wires which themselves are wound together in a helix (S direction) in a pitch of 12.5 mm; the assembly is wrapped by a single wire of diameter 0.15 mm wound in a helix (Z direction) at a pitch of 3.5 mm. The 12 wires (referenced $F_3$) and the cable (referenced C-III) have the properties indicated in Table 4.

These tires are subjected to a severe running test such as is described in section I-3, but this time with the test being performed until destruction of one of the tires tested occurs.

It will be noted that the control tire P-6, under the forced conditions of running which are imposed thereon, is destroyed at the end of 100,000 km, following breaking of the carcass ply (numerous cables C-III broken). Running is then stopped on the tire P-5 according to the invention, then the cables of the invention are extracted to measure the degeneration ΔFm of their breaking load. It will then be noted that the cables C-I according to the invention all resisted the running test (no breaking) and that they underwent an average breaking-load loss ΔFm which remains relatively low since it is less than 10% (8% on the cable, 7 to 9% on the wires taken individually, depending on the layer analysed). The use of the cable according to the invention therefore makes it possible quite significantly to increase the life of the carcass, which is moreover already excellent for the control tire.

D) Air Permeability Test

The endurance results described previously appear to be well correlated to the amount of penetrability of the cables by the rubber, as explained hereafter.

The non-fatigued cables C-I to C-III (after extraction from the new tires) were subjected to the air permeability test described in section I-2, by measuring the amount of air passing through the cables in 1 minute (average of 10 measurements). The permeability indices Pa obtained are set forth in Table 5 (in relative units). The three values indicated correspond to samples taken at three different points of the carcass reinforcement of the tires (shoulder, mid-sidewall and bottom zone of the tire), the base 100 being used for the control cables C-II of structure [1+6+12] which are used in the tires P-2 and P-4.

It will be noted that the cable according to the invention is the one which, by very far, has the lowest air permeability index Pa (10 times lower than that of the control C-II, and practically 30 times lower than that of the control cable C-III), and hence the highest amount of penetration by the rubber. Its specific construction makes it possible, during the moulding and/or curing of the tires, for virtually complete migration of the rubber within the cable to occur, as far as the center of the latter, without forming empty channels. The cable, which is thus rendered impermeable by the rubber, is protected from the flows of oxygen and moisture which pass, for example, from the sidewalls or the tread of the tires towards the zones of the carcass reinforcement, where the cable, in known manner, is subjected to the most intense mechanical working.

III-4. Other Comparative Tests

In this new series of tests, 5 layered cables are prepared, referenced C-IV to C-VIII, of construction (1+6+11) or (1+7+11), these cables being or not being in accordance with the invention, in order then to subject them to the undulating-traction fatigue test described in section I-5 above.

A) Test 4 (Cables C-IV to C-VI)

Cables C-IV to C-VI, prepared from the wires $F_1$ and $F_2$ described above, have the properties indicated in Table 6 and the following characteristics.

Cable C-IV (according to the invention):
structure [1+6+11]
$d_0$=0.200;
$(d_0/d_1)$=1.14;
$d_1$=$d_2$=0.175;
$p_1$=7; $p_2$=10.

Cable C-V (control):
structure [1+6+11]
$d_0$=0.200;
$(d_0/d_1)$=1.14;
$d_1$=$d_2$=0.175;
$p_1$=5; $p_2$=10.

Cable C-VI (control):
structure [1+6+11]
$d_0$=0.200;
$(d_0/d_1)$=1.14;
$d_1$=$d_2$=0.175;
$p_1$=7.5; $p_2$=15.

These cables therefore have a very similar construction: in the three cases, N is less by 1 than the maximum number (here $N_{max}$=12) of wires which can be wound in a single saturated layer around the layer C1; they all have a tubular-layer construction as shown in FIG. 1; the pitches $p_1$ and $p_2$ are different for each cable; the pitches $p_2$ are furthermore identical for cables C-IV and C-V. However, only cable C-IV satisfies the above relationship (v) and is therefore in accordance with the invention.

In the undulating-traction fatigue test, these three cables yielded the results appearing in Table 7; $\sigma_d$ y is expressed in MPa and in relative units (r.u.), the base 100 being used for the cable of the invention.

It will be noted that, unexpectedly, despite the very similar constructions of the cables, the cable of the invention C-IV is distinguished by significantly greater fatigue strength than that of the two control cables, in particular greater by 23% than that of the control cable C-V, only the pitch $p_1$ of which differs (relationship (v) not satisfied) in comparison with the cable of the invention.

B) Test 5 (Cables C-VII and C-VIII)

Cables C-VII and C-VIII were prepared starting from, on one hand, the wires $F_2$ previously described (average diameter φ equal to 0.175 mm) for their layers C1 and C2, and, on the other hand, from the wires referred to hereafter as $F_4$ (average diameter φ equal to approximately 0.250 mm) for their core C0. These wires $F_4$ were manufactured as indicated in section III-1 above, by adjusting the final work-hardening ratio to obtain the intended final diameter; they have the mechanical properties indicated in Table 8.

These cables C-VII and C-VIII have the following properties (see mechanical properties in Table 8):

Cable C-VII (according to the invention):
structure [1+7+11]
$d_0$=0.250;
$(d_0/d_1)$=1.43;
$d_1$=$d_2$=0.175;
$p_1$=7; $p_2$=11.

Cable C-VIII (control):
structure [1+7+11]
$d_0$=0.250;
$(d_0/d_1)$=1.43;
$d_1$=$d_2$=0.175;
$p_1$=5; $p_2$=10.

These cables therefore have a very similar construction: in the two cases, N is less by 2 than the maximum number (here $N_{max}$=13) of wires which can be wound in a single saturated layer around the layer C1, all these cables having a tubular layer-type structure as illustrated in FIG. 1. The pitches $p_1$ and $p_2$ are similar from one cable to the other, but only the cable C-VII satisfies the above relationship (v) and is therefore in accordance with the invention.

In the undulating-traction fatigue test (Table 9—base 100 used for the control cable as far as the values in relative units are concerned), the cable of the invention C-VII is distinguished by a significantly greater endurance $\pi_d$ (plus 26% approximately compared with the control), which confirms the results of the previous test (Table 7). Furthermore, an air-permeability measurement Pa was carried out, emphasising here too the superiority of the cable C-VII from the point of view of its ability to be penetrated by the rubber, and hence the best overall compromise of properties which is available with the cable of the invention.

In conclusion, as shown by the various tests above, the cables of the invention make it possible to reduce significantly the phenomena of fatigue-fretting corrosion in the carcass reinforcements of the tires, in particular the truck tires, and thus to improve the longevity of these tires.

Of course, the invention is not limited to the examples of embodiment described above.

Thus, for example, the core C0 of the cables of the invention might be formed of a wire of non-circular section, for example, one which is plastically deformed, in particular a wire of substantially oval or polygonal section, for example triangular, square or alternatively rectangular; the core C0 might also consist in a preformed wire, whether or not of circular section, for example an undulating or cork-screwed wire, or one twisted into the shape of a helix or a zigzag. In such cases, it should of course be understood that the diameter $d_0$ of the core represents the diameter of the imaginary cylinder of revolution which surrounds the core wire (diameter of bulk), and not the diameter (or any other transverse size, if its section is not circular) of the core wire itself. The same would apply if the core C0 were formed not of a single wire as in the above examples, but of several wires assembled together, for example two wires arranged parallel to each other or alternatively twisted together, in a direction of twist which may or may not be identical to that of the intermediate layer C1.

For reasons of industrial feasibility, cost and overall performance, it is however preferred to implement the invention with a single conventional linear core wire, of circular section.

Furthermore, since the core wire is less stressed during the cabling operation than the other wires, bearing in mind its position in the cable, it is not necessary for this wire to use, for example, steel compositions which offer high ductility in torsion; advantageously, any type of steel could be used, for example a stainless steel, in order to result, for example, in a hybrid steel [1+6+11] cable such as described in the aforementioned application WO98/41682, comprising a stainless steel wire at the centre and 17 carbon steel wires around it.

Furthermore, (at least) one linear wire of one of the two layers C1 and/or C2 might also be replaced by a preformed or deformed wire, or more generally by a wire of section different from that of the other wires of diameter $d_1$ and/or $d_2$, so as, for example, to improve still further the ability of the cable to be penetrated by the rubber or any other material, the diameter of bulk of this replacement wire possibly being less than, equal to or greater than the diameter ($d_1$ and/or $d_2$) of the other wires constituting the layer (C1 and/or C2) in question.

Without modifying the spirit of the invention, all or part of the wires constituting the cable according to the invention might be constituted of wires other than steel wires, whether metallic or not, in particular wires of inorganic or organic material having a high mechanical strength, for example monofilaments of liquid-crystal organic polymers such as described in Application WO92/12018. The invention also relates to any multi-strand steel cable ("multi-strand rope"), the structure of which incorporates, at least, as the elementary strand, a layered cable according to the invention.

TABLE 1

| Wires | φ | Fm (N) | At (%) | Rm (MPa) |
|---|---|---|---|---|
| $F_1$ | 0.200 | 81.7 | 1.8 | 2718 |
| $F_2$ | 0.175 | 62.3 | 2.1 | 2856 |

TABLE 2

| Cable | Fm (N) | At (%) | Rm (MPa) |
|---|---|---|---|
| C-I | 1173 | 2.7 | 2696 |
| C-II | 1255 | 2.8 | 2750 |

TABLE 3

| | | ΔFm (%) | | |
|---|---|---|---|---|
| Tire | Cable | C0 | C1 | C2 | Cable |
| P-1 | C-I | 2 | 2 | 3 | 2 |
| P-2 | C-II | 8 | 6 | 5 | 5 |
| P-3 | C-I | 3 | 3 | 4 | 4 |
| P-4 | C-II | 12 | 8 | 5 | 7 |

TABLE 4

| Wire or cable | Fm (N) | At (%) | Rm (MPa) |
|---|---|---|---|
| $F_3$ | 113 | 1.8 | 2790 |
| C-III | 1310 | 3.3 | 2560 |

TABLE 5

| Cable | Pa (r.u.) | Average Pa |
|---|---|---|
| C-I | 10-17-6 | 11 |
| C-II | 102-97-102 | 100 |
| C-III | 315-280-305 | 300 |

TABLE 6

| Cable | Fm (N) | At (%) | Rm (MPa) |
|---|---|---|---|
| C-IV | 1193 | 2.4 | 2661 |
| C-V | 1181 | 2.5 | 2614 |
| C-VI | 1211 | 2.4 | 2702 |

TABLE 7

| Cable | $\sigma_d$ (MPa) | $\sigma_d$ (r.u.) |
|---|---|---|
| C-IV | 765 | 100 |
| C-V | 621 | 81 |
| C-VI | 676 | 88 |

TABLE 8

| Wire or cable | Fm (N) | At (%) | Rm (MPa) |
|---|---|---|---|
| $F_4$ | 139 | 2.0 | 2824 |
| C-VII | 1312 | 2.4 | 2667 |
| C-VIII | 1275 | 2.5 | 2570 |

TABLE 9

| Cable | $\sigma_d$ (MPa) | $\sigma_d$ (r.u.) | Pa (r.u.) |
|---|---|---|---|
| C-VII | 779 | 126 | 38 |
| C-VIII | 619 | 100 | 100 |

We claim:

1. A multi-layer cable having a unsaturated outer layer, usable as a reinforcing element for a tire carcass reinforcement, comprising a core of diameter $d_0$ surrounded by an intermediate layer (C1) of six or seven wires (M=6 or 7) of diameter $d_1$ wound together in a helix at a pitch $p_1$, this layer C1 itself being surrounded by an outer layer (C2) of N wires of diameter $d_2$ wound together in a helix at a pitch $p_2$, N being less by 1 to 3 than the maximum number $N_{max}$ of wires which can be wound in one layer about the layer C1, this cable having the following characteristics ($d_0$, $d_1$, $d_2$, $p_1$ and $p_2$ in mm):

(i) $0.14<d_0<0.28$;
(ii) $0.12<d_1<0.25$;
(iii) $0.12<d_2<0.25$;
(iv) for M=6: $1.10<(d_0/d_1)<1.40$; for M=7: $1.40<(d_0/d_1)<1.70$;
(v) $5\pi(d_0+d_1)<p_1<p_2<5\pi(d_0+2d_1+d_2)$;
(vi) the wires of layers C1 and C2 are wound in the same twist direction.

2. A cable according to claim 1, of construction [1+M+N], the core of which being formed by a single wire.

3. A cable according to claim 2, selected from among the cables of the constructions [1+6+10], [1+6+11], [1+6+12], [1+7+11], [1+7+12] and [1+7+13].

4. A cable according to claim 2, of construction [1+6+N].

5. A cable according to claim 3 or 4, of construction [1+6+11].

6. A cable according to claim 1, which satisfies the following relationships:

$d_1=d_2$;
$5<p_1<p_2<15$.

7. A cable according to claim 6, which satisfies the following relationships:

$0.18<d_0<0.24$;
$0.16<d_1=d_2<0.19$;
$5<p_1<p_2<12$.

8. A cable according to claim 1, characterised in that it is a steel cable.

9. A cable according to claim 8, characterised in that the steel is a carbon steel.

10. A cable according to claim 1, which satisfies the relationship:

$$5.3\pi(d_0+d_1)<p_1<p_2<4.7\pi(d_0+2d_1+d_2).$$

11. The cable of claim 1, wherein the core is comprised of L wires, wherein L is equal to or greater than 2.

12. A composite fabric usable as a carcass reinforcement ply for a truck tire, comprising a matrix of rubber composition reinforced by a multi-layer cable having a unsaturated outer layer, comprising a core of diameter $d_0$ surrounded by an intermediate layer (C1) of six or seven wires (M=6 or 7) of diameter $d_1$ wound together in a helix at a pitch $p_1$, this layer C1 itself being surrounded by an outer layer (C2) of N wires of diameter $d_2$ wound together in a helix at a pitch $p_2$, N being less by 1 to 3 than the maximum number $N_{max}$ of wires which can be wound in one layer about the layer C1, said multi-layer cable having the following characteristics ($d_0$, $d_1$, $d_2$, $p_1$ and $p_2$ in mm):

(i) $0.14<d_0<0.28$;
 (ii) $0.12<d_1<0.25$;
 (iii) $0.12<d_2<0.25$;
 (iv) for M=6: $1.10<(d_0/d_1)<1.40$; for M=7: $1.40<(d_0/d_1)<1.70$;
 (v) $5\pi(d_0+d_1)<p_1<p_2<5\pi(d_0+2d_1+d_2)$;
 (vi) the wires of layers C1 and C2 are wound in the same twist direction.

13. A fabric according to claim 12, wherein the multi-layer cable is of construction [1+M+N], having a core formed by a single wire.

14. A fabric according to claim 13, wherein the multi-layer cable is selected from among the cables of the constructions [1+6+10], [1+6+11], [1+6+12], [1+7+11], [1+7+12] and [1+7+13].

15. A fabric according to claim 13 or 14, wherein the multi-layer cable has a construction [1+6+N].

16. A fabric according to claim 15, wherein the multi-layer cable has a construction [1+6+11].

17. A fabric according to claim 12, wherein the following relationships are satisfied:

$d_1=d_2$;
 $5<p_1<p_2<15$.

18. A fabric according to claim 17, wherein the following relationships are satisfied:

$0.18<d_0<0.24$;
 $0.16<d_1=d_2<0.19$;
 $5<p_1<p_2<12$.

19. A fabric according to claim 12, wherein the cable density, in the rubber composition matrix, is between 40 and 100 cables per dm of fabric.

20. A fabric according to claim 12, wherein the width $\ell$ of the bridge of rubber composition, between two adjacent cables, is between 0.35 and 1 mm.

21. A fabric according to claim 20, wherein the width $\ell$ of the bridge of rubber composition, between two adjacent cables, is between 0.5 and 0.8 mm.

22. A fabric according to claim 21, wherein the rubber composition has, in the vulcanized state, a secant tensile modulus M10 which is less than 8 MPa.

23. A fabric according to claim 22, wherein the rubber composition has, in the vulcanized state, a secant tensile modulus M10 which is between 4 and 8 MPa.

24. A truck tire having a carcass reinforcement comprising a multi-layer cable having a unsaturated outer layer, comprising a core of diameter $d_0$ surrounded by an intermediate layer (C1) of six or seven wires (M=6 or 7) of diameter $d_1$ wound together in a helix at a pitch $p_1$, this layer C1 itself being surrounded by an outer layer (C2) of N wires of diameter $d_2$ wound together in a helix at a pitch $p_2$, N being less by 1 to 3 than the maximum number $N_{max}$ of wires which can be wound in one layer about the layer C1, said multi-layer cable having the following characteristics ($d_0$, $d_1$, $d_2$, $p_1$ and $p_2$ in mm):

(i) $0.14<d_0<0.28$;
 (ii) $0.12<d_1<0.25$;
 (iii) $0.12<d_2<0.25$;
 (iv) for M=6: $1.10<(d_0/d_1)<1.40$; for M=7: $1.40<(d_0/d_1)<1.70$;
 (v) $5\pi(d_0+d_1)<p_1<p_2<5\pi(d_0+2d_1+d_2)$;
 (vi) the wires of layers C1 and C2 are wound in the same twist direction.

25. A tire according to claim 24, wherein the multi-layer cable, of construction [1+M+N], has a core formed by a single wire.

26. A tire according to claim 25, wherein the multi-layer cable is selected from among the cables of the constructions [1+6+10], [1+6+11], [1+6+12], [1+7+11], [1+7+12] and [1+7+13].

27. A tire according to claim 25, wherein the multi-layer cable has a construction [1+6+N].

28. A tire according to claim 26 or 27, wherein the multi-layer cable has a construction [1+6+11].

29. A tire according to claim 24, wherein the following relationships are satisfied:

$d_1=d_2$;
 $5<p_1<p_2<15$.

30. A tire according to claim 29, wherein the following relationships are satisfied:

$0.18<d_0<0.24$;
 $0.16<d_1=d_2<0.19$;
 $5<p_1<p_2<12$.

31. A tire according to claim 24, characterised in that the layer-cable is a steel cable.

32. A tire according to claim 31, characterised in that the steel is a carbon steel.

33. A tire according to claim 24, wherein the following relationships are satisfied:

$$5.3\pi(d_0+d_1)<p_1<p_2<4.7\pi(d_0+2d_1+d_2).$$

34. A truck tire having a carcass reinforcement comprising, as reinforcing ply, a composite fabric according to claim 12.

35. A truck tire having a carcass reinforcement comprising, as reinforcing ply, a composite fabric according to claim 19.

36. A truck tire having a carcass reinforcement comprising, as reinforcing ply, a composite fabric according to claim 20 or 21.

37. A truck tire having a carcass reinforcement comprising, as reinforcing ply, a composite fabric according to claim 22 or 23.

* * * * *